United States Patent
Ying et al.

(10) Patent No.: US 6,937,000 B2
(45) Date of Patent: Aug. 30, 2005

(54) CROSS REGULATION AND METHODS FOR CONTROLLING BOOST CONVERTER

(75) Inventors: JianPing Ying, Taoyuan Shien (TW);
Teng Liu, Taoyuan Shien (TW);
JianHong Zeng, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 0 days.

(21) Appl. No.: 10/836,781

(22) Filed: Apr. 30, 2004

(65) Prior Publication Data

US 2004/0217747 A1 Nov. 4, 2004

(30) Foreign Application Priority Data

May 1, 2003 (TW) ........................................ 92112045 A (51) Int. Cl.[7] ................................................. C05F 1/40
(52) U.S. Cl. ....................................................... 323/283
(58) Field of Search ................................. 323/282, 283, 323/285, 351

(56) References Cited

U.S. PATENT DOCUMENTS 5,912,549 A * 6/1999 Farrington et al. ......... 323/207
6,366,070 B1 * 4/2002 Cooke et al. ............... 323/284
6,469,917 B1 * 10/2002 Ben-Yaakov ................ 363/44
6,861,830 B1 * 3/2005 Tzeng et al. ............... 323/284

* cited by examiner

*Primary Examiner*—Adolf Berhane
(74) *Attorney, Agent, or Firm*—Volpe And Koenig, P.C.

(57) ABSTRACT

A cross regulation controller and the methods for controlling a boost converter are proposed. The boost converter includes the first and second switch elements, and the first and second output capacitors. The cross regulation controller includes a first feedback control circuit for processing the second voltage, a sampling of the voltage across the second output capacitor, with a reference voltage to produce a third voltage and to transform the third voltage to generate a first pulse signal to drive the first switch element, and a second feedback control circuit for processing the first voltage, a sampling of the voltage across the first output capacitor, with a reference voltage to produce a fourth voltage and to transform the fourth voltage to generate a second pulse signal to drive the second switch element so as to achieve a balancing status between the first voltage and the second voltage.

12 Claims, 14 Drawing Sheets

CROSS REGULATION AND METHODS FOR CONTROLLING BOOST CONVERTER

FIELD OF THE INVENTION

The present invention relates to the cross regulation and the methods for controlling a boost converter. More specifically, this invention relates to the cross regulation and the methods for controlling a three-level boost converter.

BACKGROUND OF THE INVENTION

The three-level boost converter is the simplest form of the multi-level boost converter in the prior art. Please refer to FIG. 1, it shows the schematic diagram of a typical three-level boost converter. In which, Vin is the input voltage supply, L is the boost inductor, S1 and S2 are the power switches (using MOSFET as an example), D1 and D2 are the power diodes, C1 and C2 are the output capacitors, and R is the load respectively.

While compared with the traditional single-switch boost converter, the three-level boost converter has the following advantages: relatively lower voltage stress on the power elements, higher efficiency, and lower EMI. Therefore, the three-level boost converter is especially suitable for the applications having relatively higher output voltage. After the frequency-doubling technique is employed, the three-level boost converter can be used to lower the input harmonic current and to decrease the current ripples of the boost inductor more effectively.

Though having the afore-mentioned advantages, there is a serious drawback of the three-level boost converter that is the unbalancing of the two voltages across the two output capacitors respectively. This drawback will hamper the real applications of the three-level boost converter.

To overcome the unbalancing of the two voltages across the two output capacitors of the three-level boost converter respectively, the most popular solution in the prior art is to employ the balancing resistors to balance the two voltages. Please refer to FIG. 2, in which, R1 and R2 are the balancing resistors.

Figure 2:
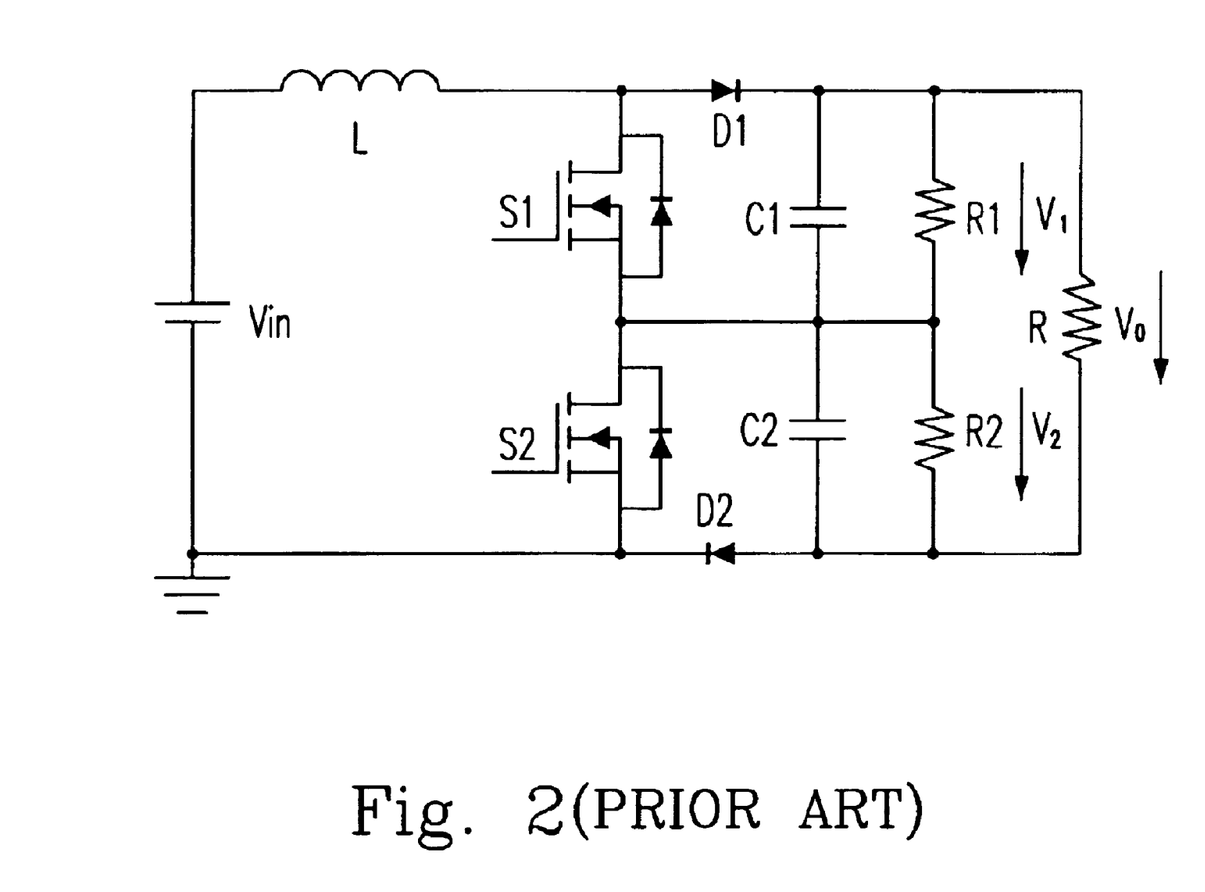
FIG. 2 is the schematic diagram of a three-level boost converter with the balancing resistors in the prior art.

The basic operational principles of the above-mentioned voltage balancing technique are described as follows. Under the normal operational conditions, the duty ratios of the switch elements S1 and S2 are different due to the discrepancies of the real circuits and the inconsistencies of the driving circuits and the power elements. The currents flowing through the output capacitors, C1 and C2, are not the same when R1 and R2 are not included so as to result in the unbalancing of $V_1$ and $V_2$. To solve the problem of voltage unbalancing, usually the balancing resistors, R1 and R2, are connected to the output capacitors, C1 and C2, in parallel. Under the circumstances of the voltage unbalancing, the current flows through the output capacitor with a relatively higher voltage will be relatively higher to decrease the unbalancing of the two output voltages so as to achieve the balancing of the two output voltages. Though this alternative is relatively easy to be implemented and has a good effectiveness, but still it has a noticeable drawback that is the power consumption on the balancing resistors are relatively higher.

According to the theoretical derivations, the following result could be reached when R1=R2, and a DC voltage supply is inputted.

$$P^* = (\Delta D^* Vo)/(k^* Vin)$$

Wherein, ΔD is the ABS value of the difference between the duty ratios of switch elements S1 and S2, Vo is the average value of the output voltage, Vin is voltage of the input voltage supply, k=|V1−V2|/(Vo/2) is a balancing coefficient for measuring the balancing effectiveness, P* is the normalization of the power consumption of the balancing resistors which is the ratio of the total power consumption of R1 and R2 and the input power.

Assuming that the output voltage is 4 times of the input voltage and the difference between the duty ratios of the two switch elements S1 and S2, ΔD, is only 0.1%, if k=0.1 is required, then p*=0.04. Which indicates that under the relatively loose requirement, the power consumption of the balancing resistors are still relatively higher, about 4% of the input power, so as to damper the realization of a higher efficiency and the applications of the three-level converter.

Keeping the drawbacks of the prior arts in mind, and employing experiments and research full-heartily and persistently, the cross regulation and methods for controlling the booster converter are finally conceived by the applicants.

SUMMARY OF THE INVENTION

It is therefore an object of the present invention to propose the cross regulation methods for controlling a boost converter to achieve the balancing of the two voltages across the two output capacitors respectively.

It is therefore another object of the present invention to propose a cross regulation controller for controlling the boost converter.

According to the aspect of the present invention, the method for controlling a boost converter with a cross regulation controller, wherein the boost converter includes a first switch element, a second switch element, a first output capacitor, and a second output capacitor, the first switch element is connected to the second switch element at a first node in series, the first output capacitor is connected to the second output capacitor at a second node in series, and the first node is electrically connected to the second node, and the controller includes a first processor, a second processor, a first modulator, a second modulator, a first pulse generation unit, and a second pulse generation unit, includes the steps of: (a) detecting a first voltage through sampling a voltage across the first output capacitor and a second voltage through sampling a voltage across the second output capacitor respectively; (b) setting a reference voltage; (c) obtaining a first output signal and a second output signal through processing the second voltage and the reference voltage by the first processor, and processing the first voltage and the reference voltage by the second processor respectively; (d) generating a first voltage modulated signal and a second voltage modulated signal through processing the first output signal by the first modulator, and processing the second output signal by the second modulator respectively; (e) generating a first driving signal and a second driving signal through processing the first voltage modulated signal by the first pulse generation unit, and processing the second voltage modulated signal by the second pulse generation unit respectively; and (f) controlling the first switch element to be in one of an open status and a close status and the second switch element to be in one of an open status and a close status through the first driving signal and the second driving signal respectively so as to achieve a balancing status between the first voltage and the second voltage.

Preferably, the reference voltage is equivalent to one half of a sum of the first voltage and the second voltage.

According to the aspect of the present invention, the method for controlling a boost converter, wherein the boost converter includes a first switch element, a second switch element, a first output capacitor, and a second output capacitor, the first switch element is connected to the second switch element at a first node in series, the first output capacitor is connected to the second output capacitor at a second node in series, and the first node is electrically connected to the second node, includes the steps of: (a) detecting a first voltage through sampling a voltage across the first output capacitor and a second voltage through sampling a voltage across the second output capacitor respectively; (b) setting a reference voltage; (c) obtaining a third voltage and a fourth voltage through processing the second voltage with the reference voltage and the first voltage with the reference voltage respectively; (d) generating a first pulse signal and a second pulse signal by processing the third voltage through a first pulse generation unit and by processing the fourth voltage through a second pulse generation unit respectively; and (e) controlling the first switch element to be in one of an open status and a close status, and the second switch element to be in one of an open status and a close status through the first pulse signal and the second pulse signal respectively so as to achieve a balancing status between the first voltage and the second voltage.

Preferably, the reference voltage is equivalent to one half of a sum of the first voltage and the second voltage.

Preferably, the third voltage equals to the reference voltage minus the second voltage and the fourth voltage equals to the reference voltage minus the first voltage respectively.

Preferably, the step (d) further includes the steps of: generating a first voltage modulated signal and a second voltage modulated signal by processing the third voltage through a first voltage modulator and processing the fourth voltage through a second voltage modulator respectively; and generating the first pulse signal and the second pulse signal by processing the first voltage modulated signal through the first pulse generation unit and processing the second voltage modulated signal through the second pulse generation unit respectively.

According to the aspect of the present invention, the cross generation controller for controlling a boost converter, wherein the boost converter includes a first switch element, a second switch element, a first output capacitor, a second output capacitor, a first voltage across the first output capacitor, and a second voltage across the second output capacitor, the first switch element is connected to the second switch element at a first node in series, the first output capacitor is connected to the second output capacitor at a second node in series, the first node is electrically connected to the second node, and the controller is employed to achieve a balancing status between the first voltage and the second voltage, includes: a first feedback control circuit, wherein a feedback of the second voltage and a reference voltage are processed to generate a third voltage, the third voltage is transformed to generate a first pulse signal, and the first pulse signal is used to drive the first switch element, and a second feedback control circuit, wherein a feedback of the first voltage and the reference voltage are processed to generate a fourth voltage, the fourth voltage is transformed to generate a second pulse signal, and the second pulse signal is used to drive the second switch element.

Preferably, the reference voltage is equivalent to one half of a sum of the first voltage and the second voltage.

Preferably, the first voltage modulated signal is generated by the first feedback control circuit with the third voltage and processed through a first pulse generation unit so as to generate a first pulse signal.

Preferably, the second voltage modulated signal is generated by the second feedback control circuit with the fourth voltage and processed through a second pulse generation unit so as to generate a second pulse signal.

Preferably, the third voltage equals to the reference voltage minus the second voltage and the fourth voltage equals to the reference voltage minus the first voltage respectively.

Preferably, the controller further includes a processor to subtract the second voltage from the reference voltage to generate the third voltage and to subtract the first voltage from the reference voltage to generate the fourth voltage respectively.

The present invention may best be understood through the following descriptions with reference to the accompanying drawings, in which:

BRIEF DESCRIPTION OF THE DRAWINGS

FIG. 3($a$) and FIG. 3($b$) are the diagrams showing the waveforms of the driving signals of switch elements S1 and S2, and the currents on boost inductor L of a typical three-level boost converter for Vin<Vo/2 and Vin>Vo/2 respectively;

FIG. 4($a$) and FIG. 4($b$) are the block diagrams of the preferred embodiment of the present invention;

FIGS. 5($a$) to 5($c$) are the schematic circuit diagrams showing the three operational modes of the present invention, and FIGS. 5($d$) and 5($e$) are the diagrams showing the waveforms of the driving signals of switch elements S1 and S2, and the current on boost inductor L of a three-level boost converter with a cross regulation controller for Vin<Vo/2 respectively;

FIGS. 6($a$) to 6($c$) are the schematic circuit diagrams showing the three operational modes of the present invention, and FIGS. 6($d$) and 6($e$) are the diagrams showing the waveforms of the driving signals of switch elements S1 and S2, and the current on boost inductor L of a three-level boost converter with a cross regulation controller for Vin>Vo/2 respectively.

DETAILED DESCRIPTION OF THE PREFERRED EMBODIMENT

Figure 1:
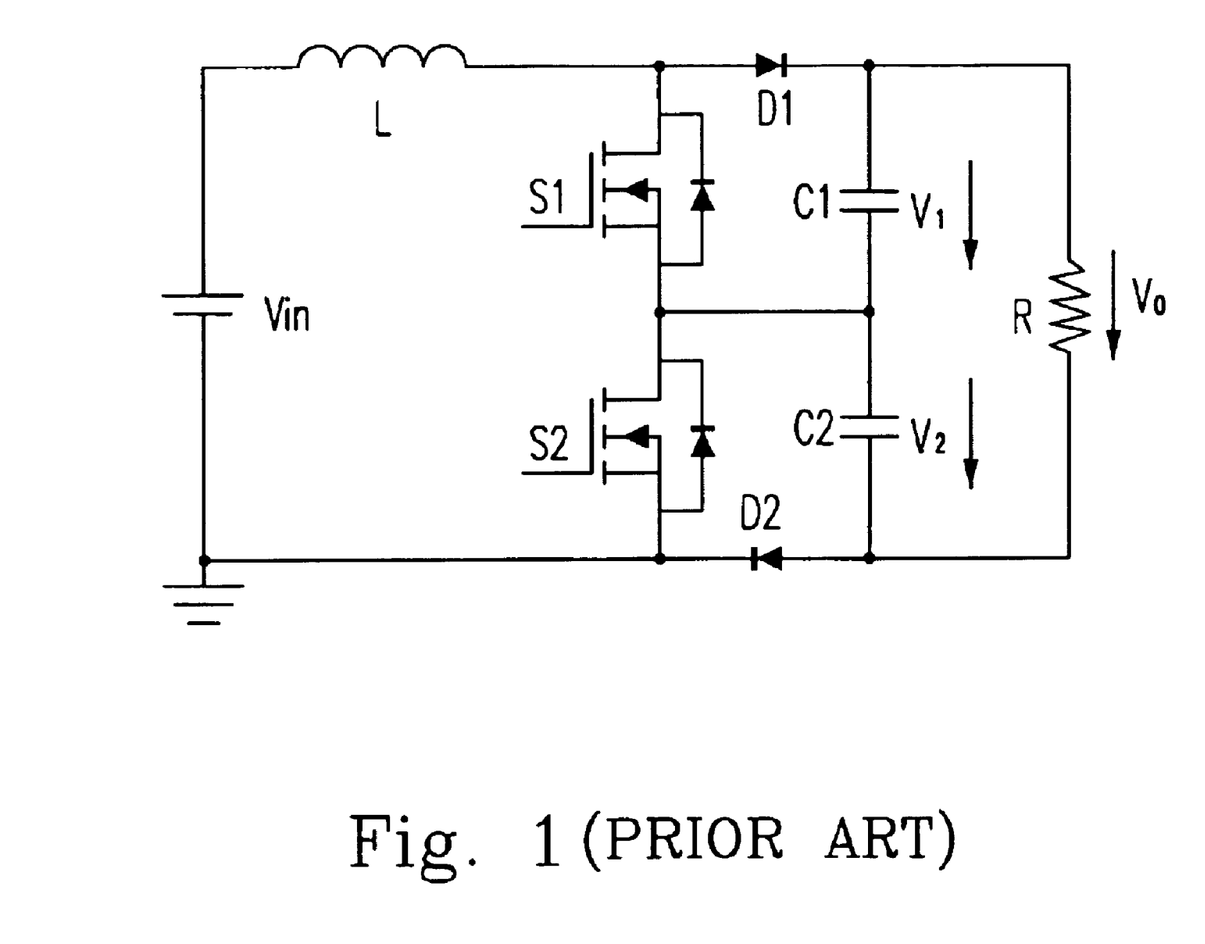
FIG. 1 is the schematic diagram of a typical three-level boost converter in the prior art.
Figure 3:
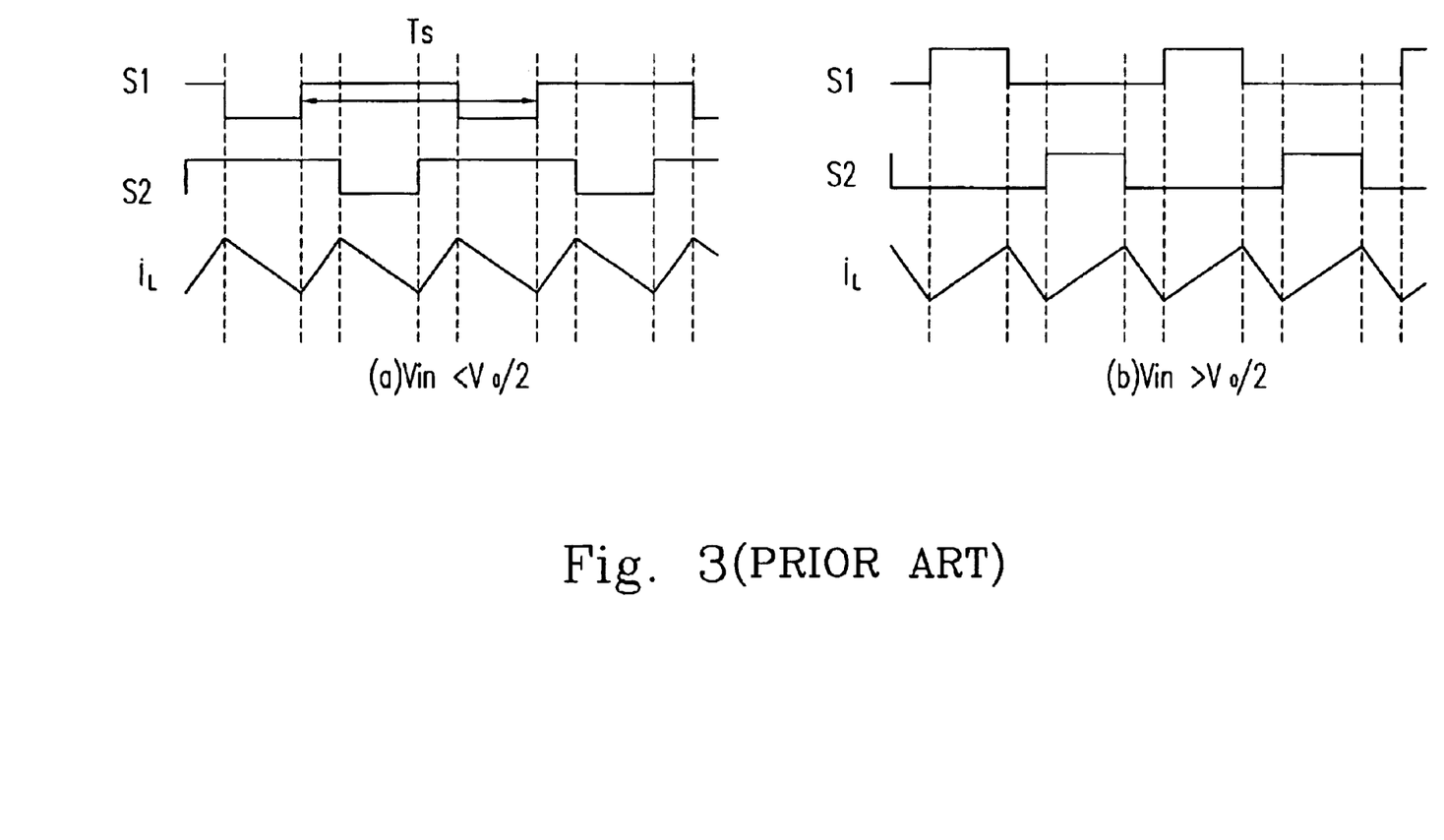

Please refer to FIGS. 3($a$) and 3($b$), in which the operational principles of the typical three-level boost converter are shown. FIG. 3($a$) is a diagram showing the waveforms of the driving signals on the switch elements S1 and S2, and the current on the boost inductor L of a typical three-level boost converter when the input voltage (Vin) is lower than one half of the output voltage (Vo/2) respectively. FIG. 3($b$) is a diagram showing the waveforms of the driving signals on the switch elements S1 and S2, and the current on the boost inductor L of a typical three-level boost converter when the input voltage (Vin) is higher than one half of the output voltage (Vo/2) respectively. In FIGS. 3($a$) and 3($b$), the uppermost two curves are the driving signals of the switch elements S1 and S2, as shown in FIGS. 1 and 2, and the relatively higher voltage levels represent that the two switch elements S1 and S2 are closed respectively. Referring to FIGS. 3($a$) and 3($b$), the lowest curve $i_L$ is the waveform of the current on boost inductor L respectively. Here, the control method of the frequency-doubling technique is employed and which can be observed from the driving signals: the duty ratios of switch elements S1 and S2 are equal, but there is a 180° phase shift between the two driving signals, and which will result in that the frequency of $i_L$ is twice the ripple frequency of the driving signals so as to have the effectiveness of the frequency-doubling technique.

The two operational modes of a three-level boost converter defined according to the different input voltages are described as follows. The two switch elements S1 and S2 must be closed simultaneously to let the current of the boost inductor $i_L$ to increase when the input voltage (Vin) is lower than one half of the output voltage (Vo/2). The two switch elements S1 and S2 must be opened simultaneously to let the current of the boost inductor $i_L$ to decrease when the input voltage (Vin) is higher than one half of the output voltage (Vo/2).

Basically, the above-mentioned operational principles of the three-level boost converter are followed in the present invention. Besides, the duty ratios of the first and second switch elements S1 and S2 are adjusted through the feedbacks of the two voltages across the two output capacitors respectively so as to accomplish the balancing of the two voltages across the two output capacitors.

Figure 4A:
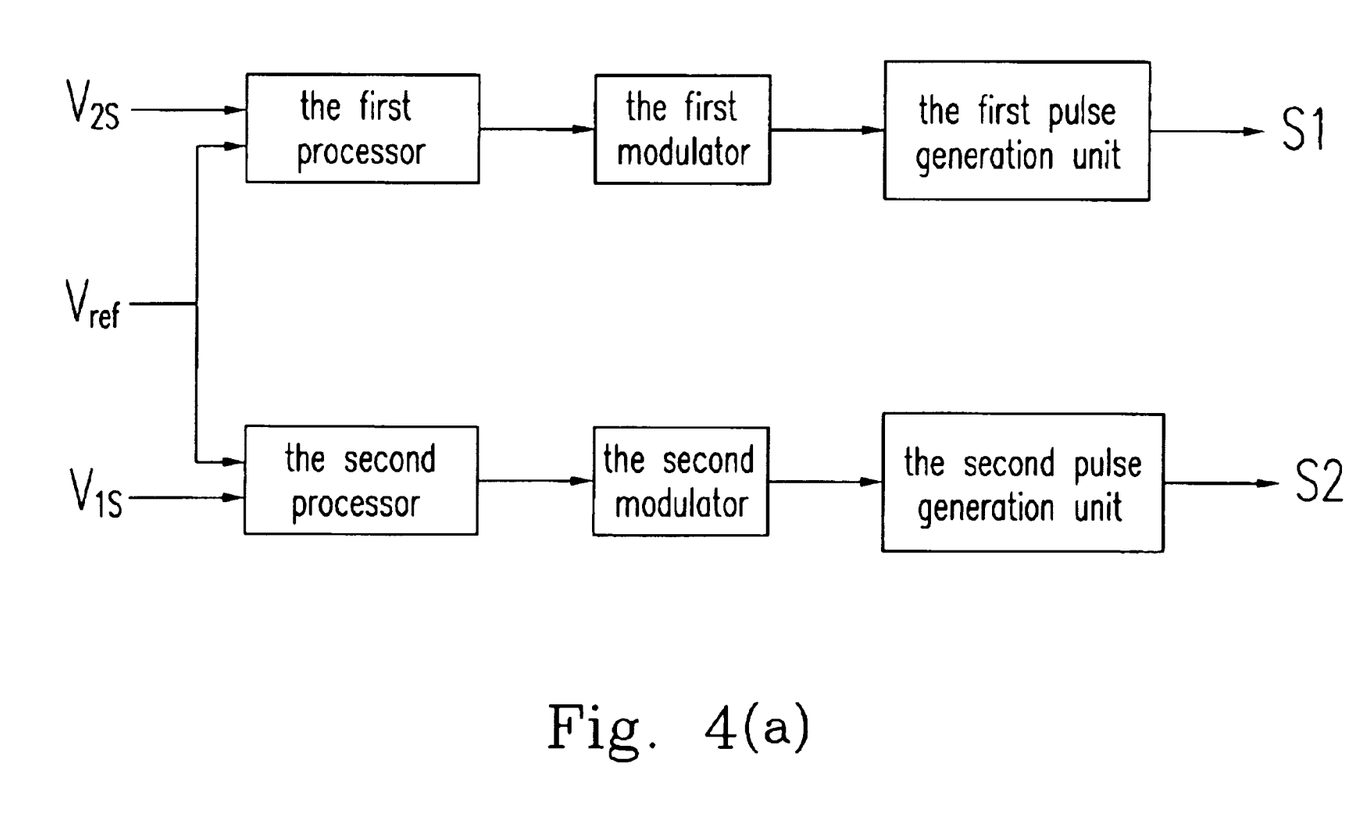

FIG. 4(a) is the block diagram showing the cross regulation principles of the present invention. In FIG. 4(a), $V_{1S}$ and $V_{2S}$ are the sampling voltage values across the first and second output capacitors, C1 and C2, and $V_{1S}$ and $V_{2S}$ have certain relationships with $V_1$ and $V_2$ respectively. For example, $V_{1S}$ and $V_{2S}$ could be proportional to $V_1$ and $V_2$ respectively. Firstly, $V_{2S}$ and the reference voltage Vref (in general, Vref is equivalent to ½Vo) are sent into the first processor, and $V_{1S}$ and the reference voltage Vref are sent into the second processor respectively. Secondly, the outputs of the first and second processors are sent to the first and second modulators respectively. Thirdly, the outputs of the first and second modulators are sent to the first and second pulse generation units respectively. Fourthly, the outputs of the first and second pulse generation units are employed as the driving signals of the first and second switch elements S1 and S2 respectively. Through the alternate feedback control of the voltages of the first and second output capacitors, $V_{1S}$ and $V_{2S}$, the duty ratios of the first and second switch elements, S1 and S2, can be adjusted to accomplish the balancing between the two voltages $V_{1S}$ and $V_{2S}$.

Figure 4B:
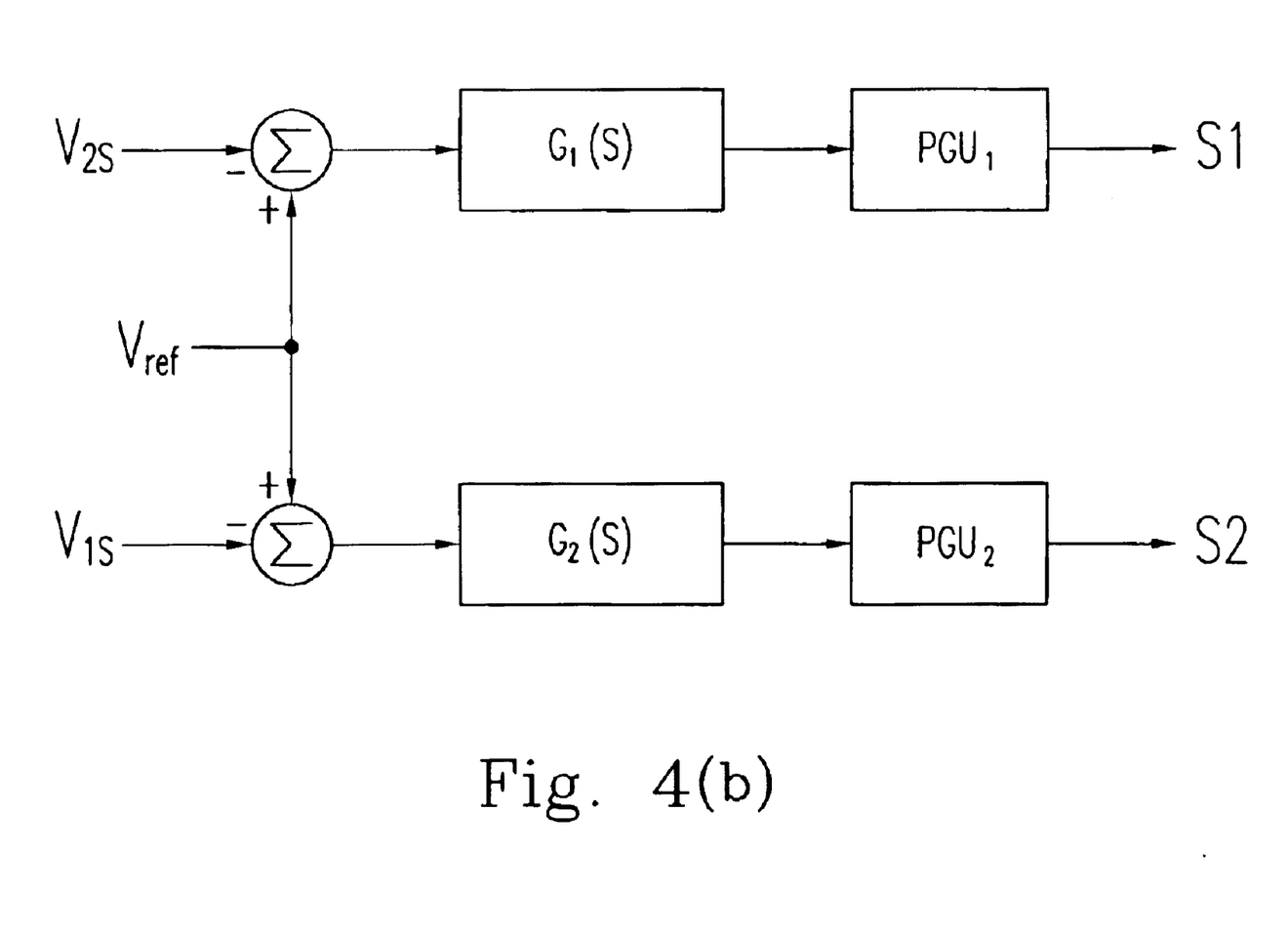

FIG. 4(b) is the block diagram of the preferred embodiment of the present invention for the cross regulation of a three-level boost converter. In FIG. 4(b), $V_{1S}$ and $V_{2S}$ are the sampling voltage values across the first and second output capacitors, C1 and C2, respectively. Firstly, the difference of $V_{2S}$ and the reference voltage Vref (in general, Vref is equivalent to ½Vo) is sent into the first modulator $G_1(s)$, and the difference of V1 and the reference voltage Vref is sent into the second modulator $G_2(s)$ respectively. Secondly, the outputs of the first and second modulators, $G_1(s)$ and $G_2(s)$, are sent to the first and second pulse generation units, PGU1 and PGU2, respectively. Thirdly, the outputs of the PGU1 and PGU2 are employed as the driving signals of the first and second switch elements, S1 and S2, respectively. Through the cross regulation of the sampling voltages values of the first and second output capacitors, $V_{1S}$ and $V_{2S}$, the duty ratios of the first and second switch elements, S1 and S2, can be adjusted to accomplish the balancing between the two voltages $V_{1S}$ and $V_{2S}$.

The control principles of the preferred embodiment of the present invention are described as follows. Firstly, the principles of adjustment while the voltage of the first output capacitor $V_{1S}$ is lower and the voltage of the second output capacitor $V_{2S}$ is higher are introduced. Secondly, the principles of adjustment while the voltage of the first output capacitor $V_{1S}$ is higher and the voltage of the second output capacitor $V_{2S}$ is lower are introduced.

Figure 5:
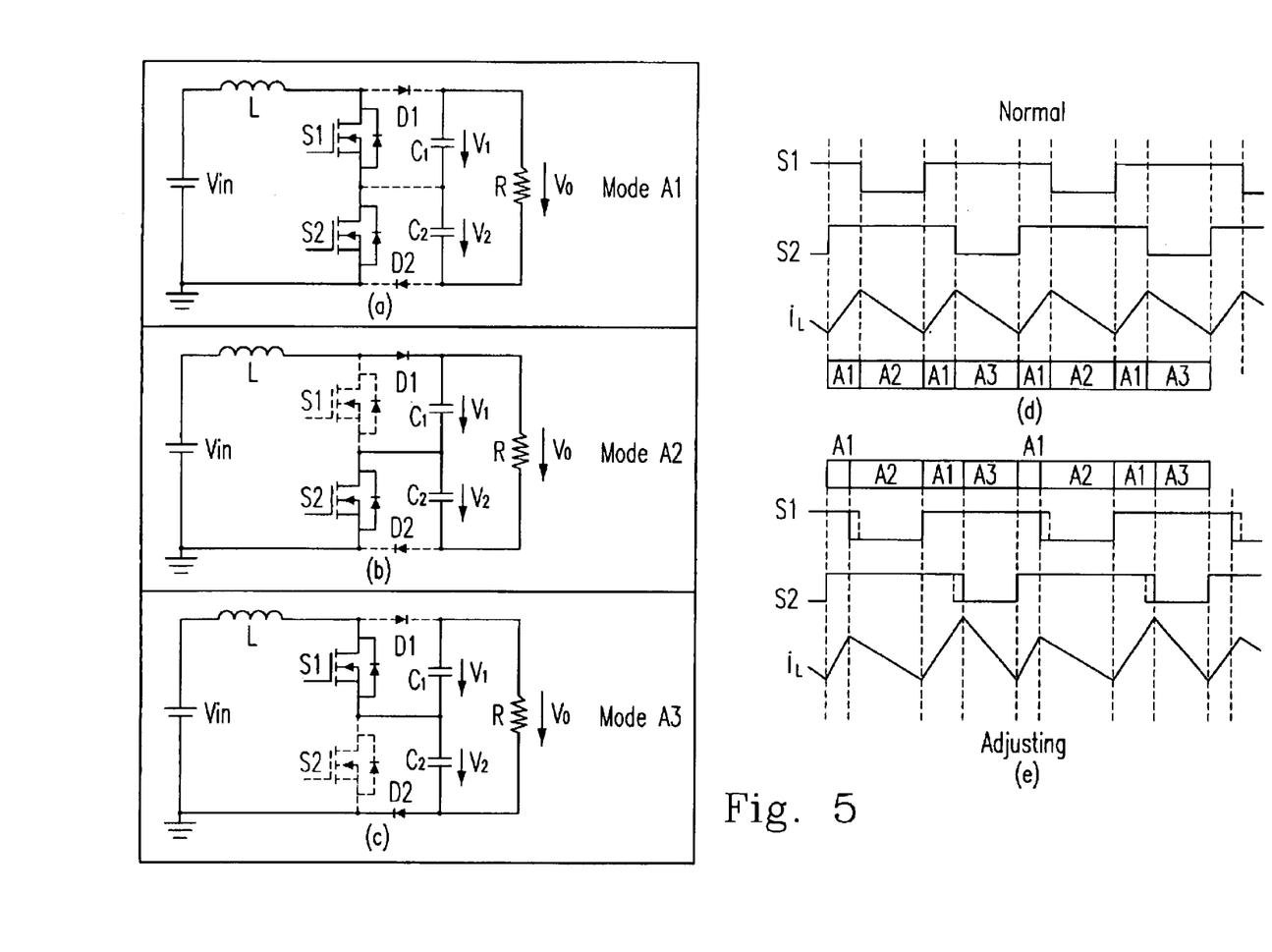

FIGS. 5(a) to 5(c) are the three schematic circuit diagrams of the preferred embodiments of the present invention for the cross regulation of a three-level boost converter when the input voltage (Vin) is lower than one half of the output voltage (Vo/2), and there are three operational modes: Mode A1, Mode A2, and Mode A3 respectively. FIG. 5(d) shows the waveforms of the driving signals of the switch elements S1 and S2, and the current on the boost inductor L, $i_L$, before the cross regulation respectively (under the normal operation). When the voltage $V_1$ is lower, and the voltage $V_2$ is higher, the cross regulation will let the duty ratio of the switch element S1 decrease and the duty ratio of the switch element S2 increase. Please refer to FIG. 5(e), the real line-segments, which are co-existed with the dotted line-segments, represent the real duty ratios during the procedure of adjustments. The total lasting time that both of the switch elements S1 and S2 are closed (Mode A1) is not changed which means both of the output capacitors, C1 and C2, are discharged, the total lasting time that the switch element S1 is opened and the switch element S2 is closed is prolonged which means that the output capacitor C1 is charged (Mode A2), and the total lasting time that the switch element S1 is closed and the switch element S2 is opened is shortened which means that the output capacitor C2 is charged (Mode A3) such that $V_1$ will be increased and $V_2$ will be decreased so as to make the two voltages across the two output capacitors, $V_1$ and $V_2$ respectively, to approach equal values.

Figure 6:
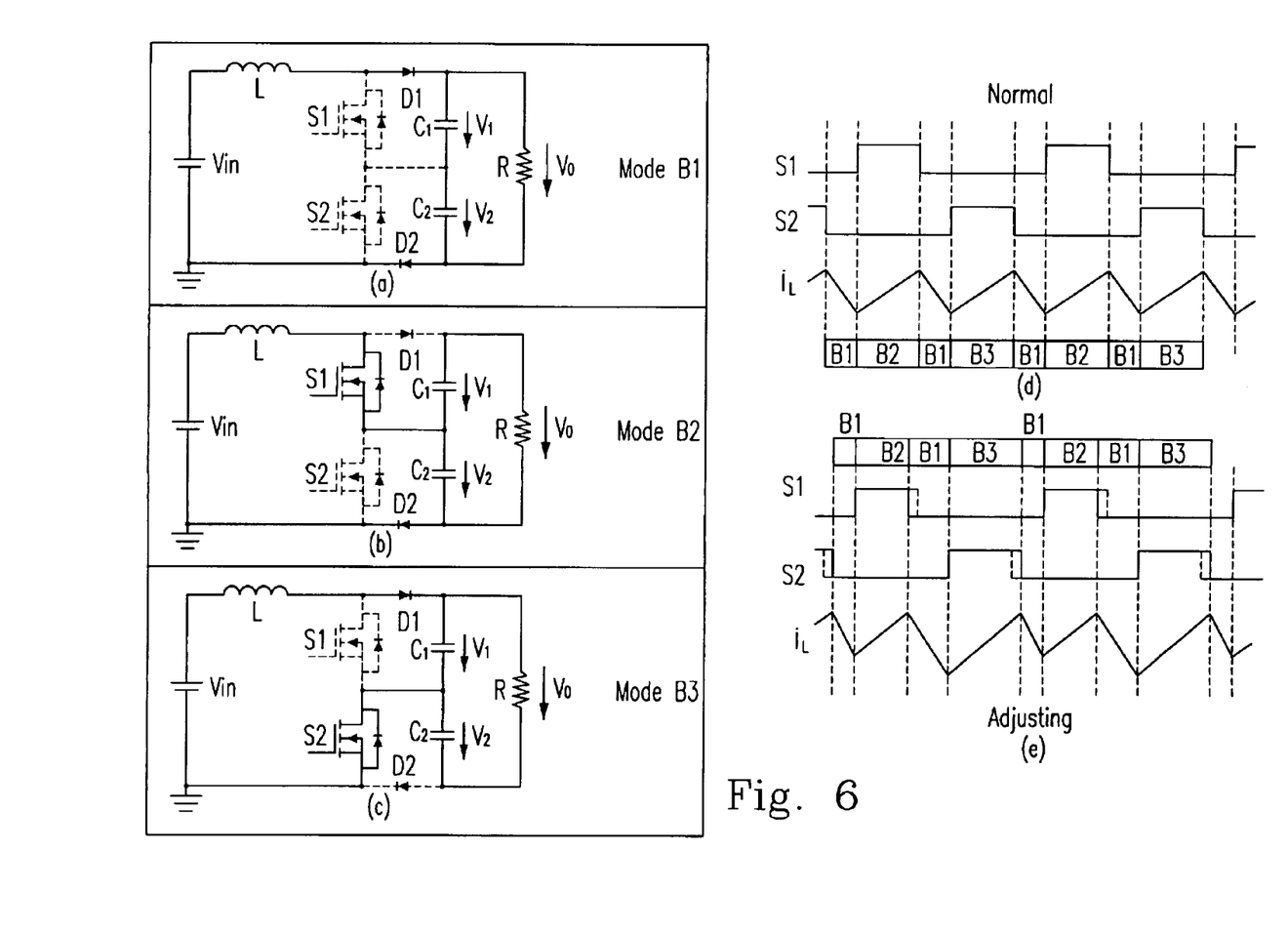
Figure 7:
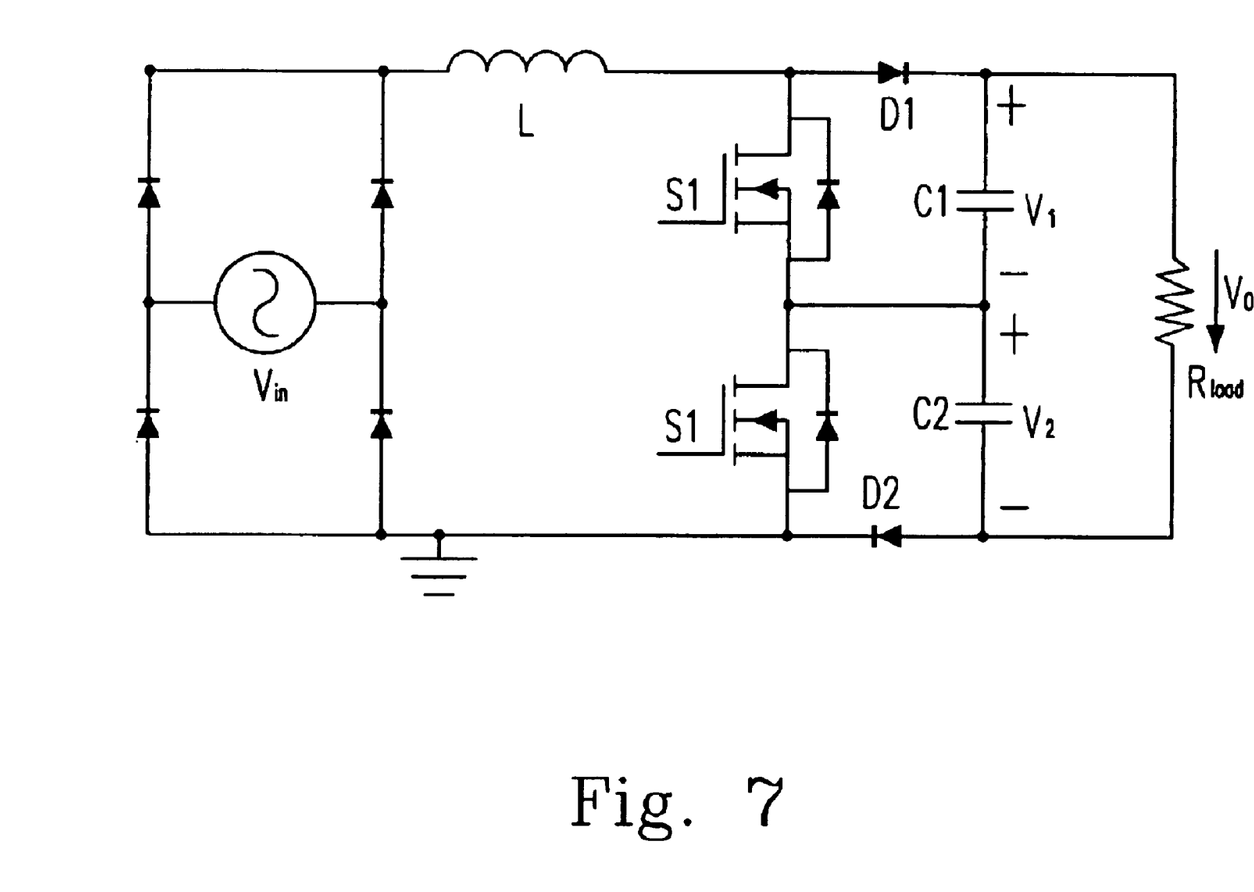
FIGS. 7 to 13 are the schematic circuit diagrams of the preferred embodiments of the present invention.

FIGS. 6(a) to 6(c) are the three schematic circuit diagrams of the preferred embodiments of the present invention for the cross regulation of a three-level boost converter when the input voltage (Vin) is higher than one half of the output voltage (Vo/2), and there are three operational modes: Mode B1, Mode B2, and Mode B3 respectively. FIG. 6(d) shows the waveforms of the driving signals of the switch elements S1 and S2, and the current on the boost inductor L, $i_L$, before the cross regulation respectively (under the normal operation). When the voltage $V_1$ is relatively lower, and the voltage $V_2$ is relatively higher, the cross regulation will let the duty ratio of the switch element S1 decrease and the duty ratio of the switch element S2 increase. Please refer to FIG. 6(e), the real line-segments, which are co-existed with the dotted line-segments, represent the real duty ratios during the procedure of adjustments. The total lasting time that both of the switch elements S1 and S2 are opened (Mode B1) is not changed which means that the total lasting time that both of the output capacitors, C1 and C2, are charged is not changed, the total lasting time that the switch element S1 is closed and the switch element S2 is opened (Mode B2) is shortened which means that the output capacitor C1 is discharged and the output capacitor C2 is charged, and the total lasting time that the switch element S1 is opened and the switch element S2 is closed (Mode B3) is prolonged which means that the output capacitor C1 is charged and the output capacitor C2 is discharged such that $V_1$ will be increased and $V_2$ will be decreased so as to make the two voltages across the two output capacitors, $V_1$ and $V_2$ respectively, to approach equal values.

From the above discussion, if the voltage $V_1$ is relatively lower and the voltage $V_2$ is relatively higher, the cross regulation method of the present invention could be employed to achieve the balancing of the two voltages across the two output capacitors, $V_1$ and $V_2$ respectively. For the same reason, if the voltage $V_1$ is relatively higher and the voltage $V_2$ is relatively lower, the cross regulation method of the present invention could be employed to achieve the balancing of the two voltages across the two output capacitors, $V_1$ and $V_2$ respectively, as well.

One of the special features of the present invention is to measure the two voltages across the two output capacitors, $V_1$ and $V_2$, and through the cross regulation of the duty ratios of the two switch elements, S1 and S2, to accomplish the balancing of the two voltages across the two output capacitors, $V_1$ and $V_2$ respectively. The so-called cross regulation means to adjust the duty ratio of the switch element S2 by the voltage of the output capacitor C1, $V_1$, and to adjust the duty ratio of the switch element S1 by the voltage of the output capacitor C2, $V_2$. Knowing from the proposed circuits of the present invention, the amount of feedback and the status of the controlled component are in two crossed directions.

The advantages of the present invention are that the proposed cross regulation methods are relatively simple, and the effectiveness of each proposed methods is also relatively good. Since the balancing resistors in the prior art are omitted so the concern regarding the power consumption of the balancing resistors is not an issue any more, and the efficiency of the three-level boost converter is increased dramatically.

Figure 8:
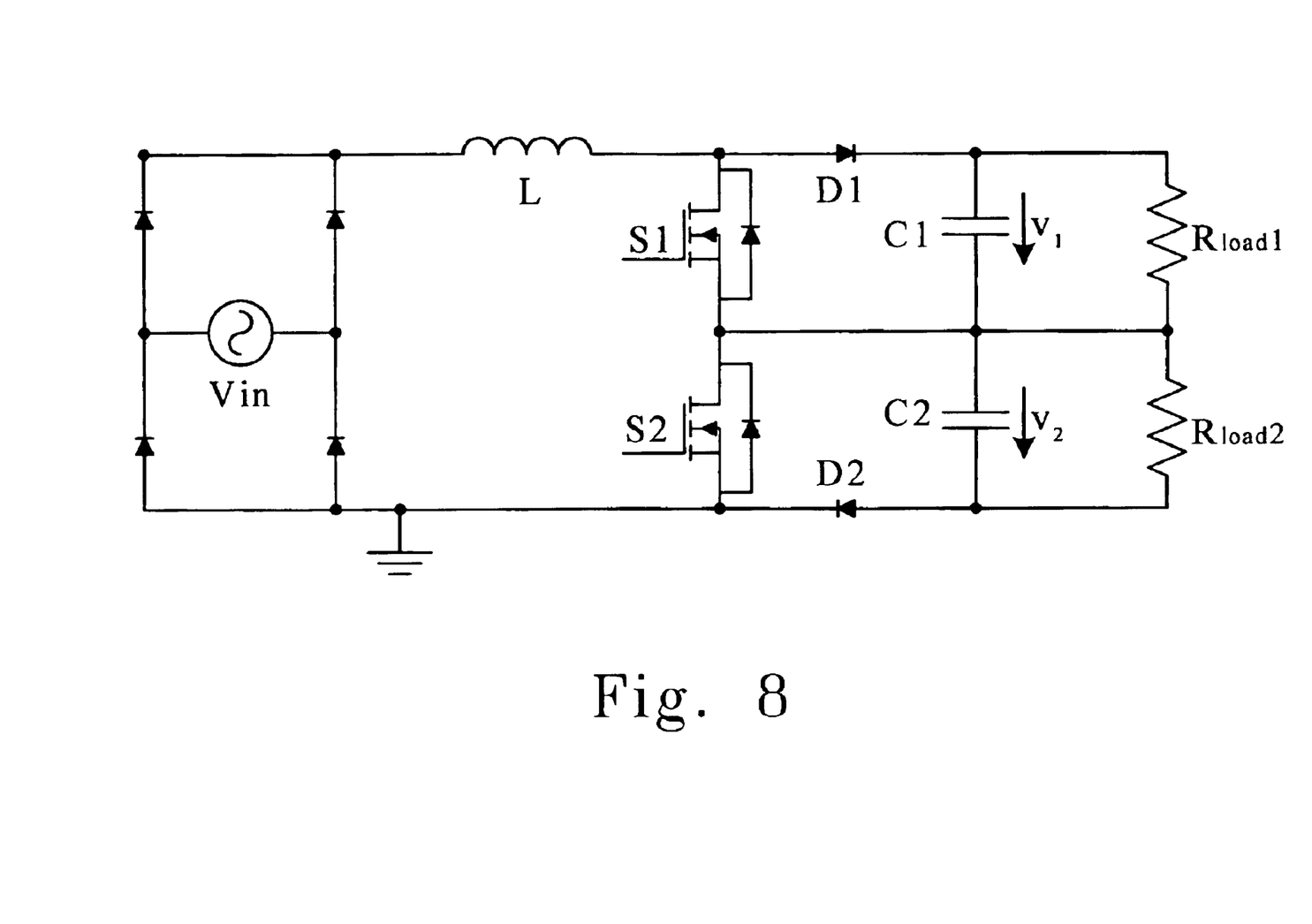
Figure 9:
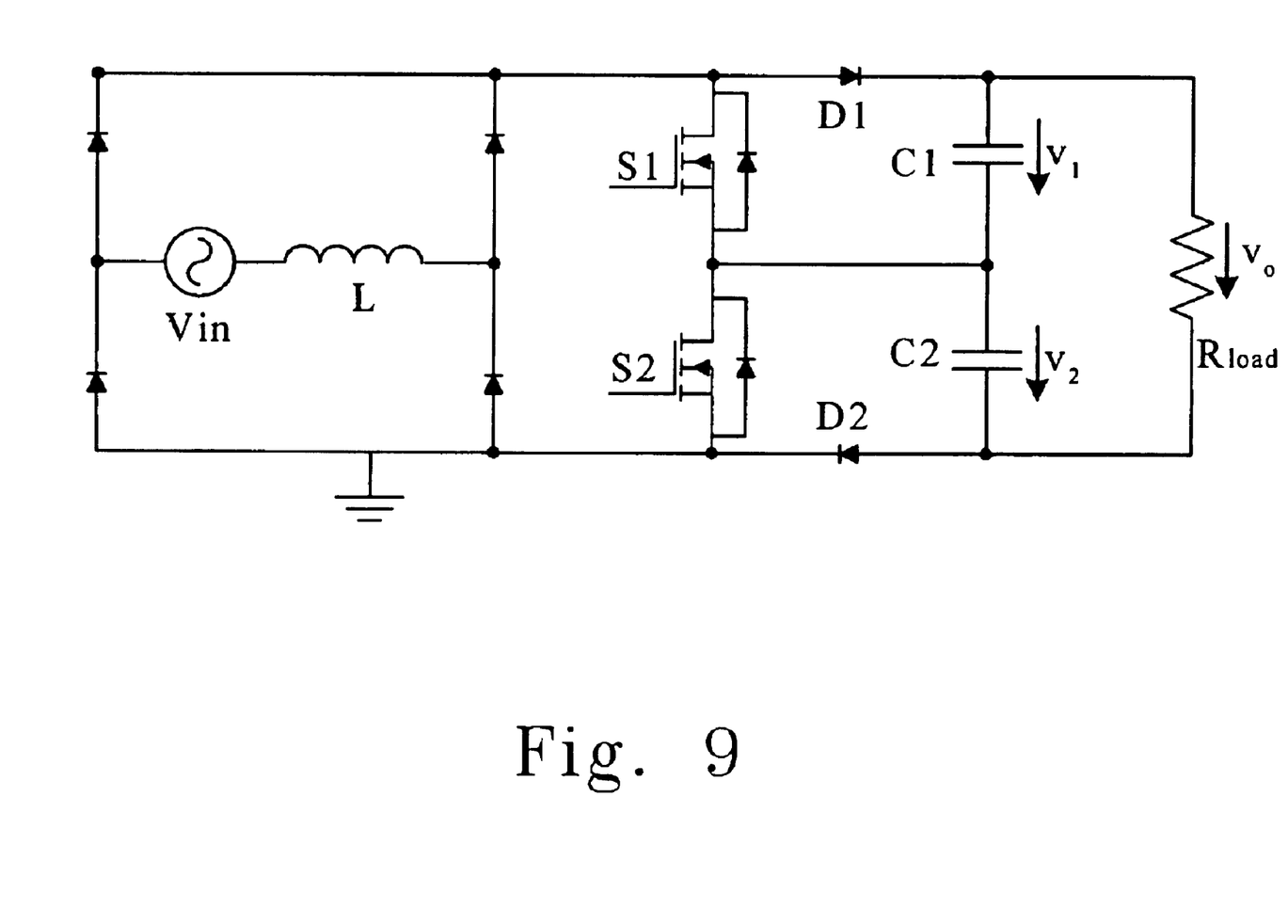
Figure 10:
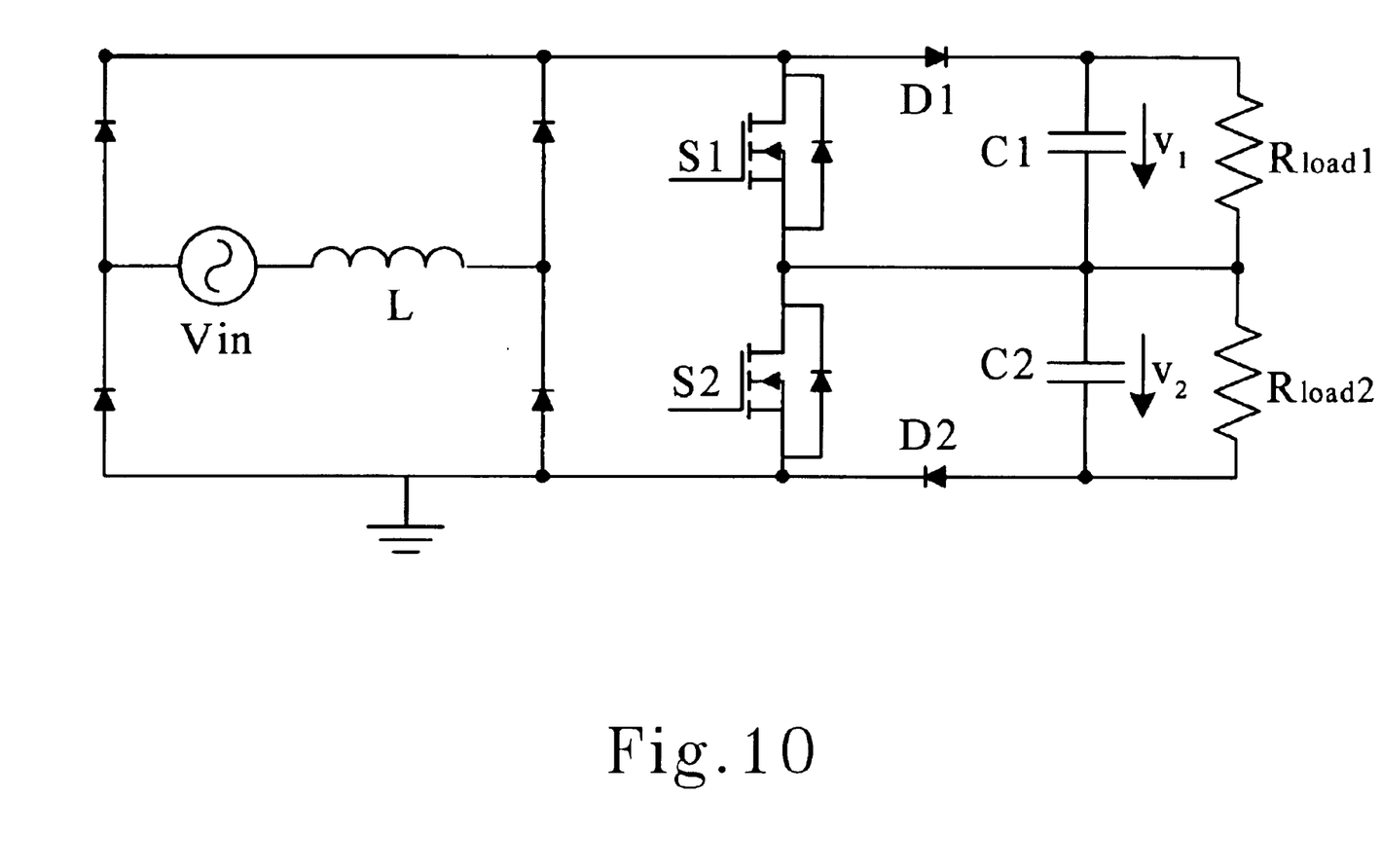
Figure 11:
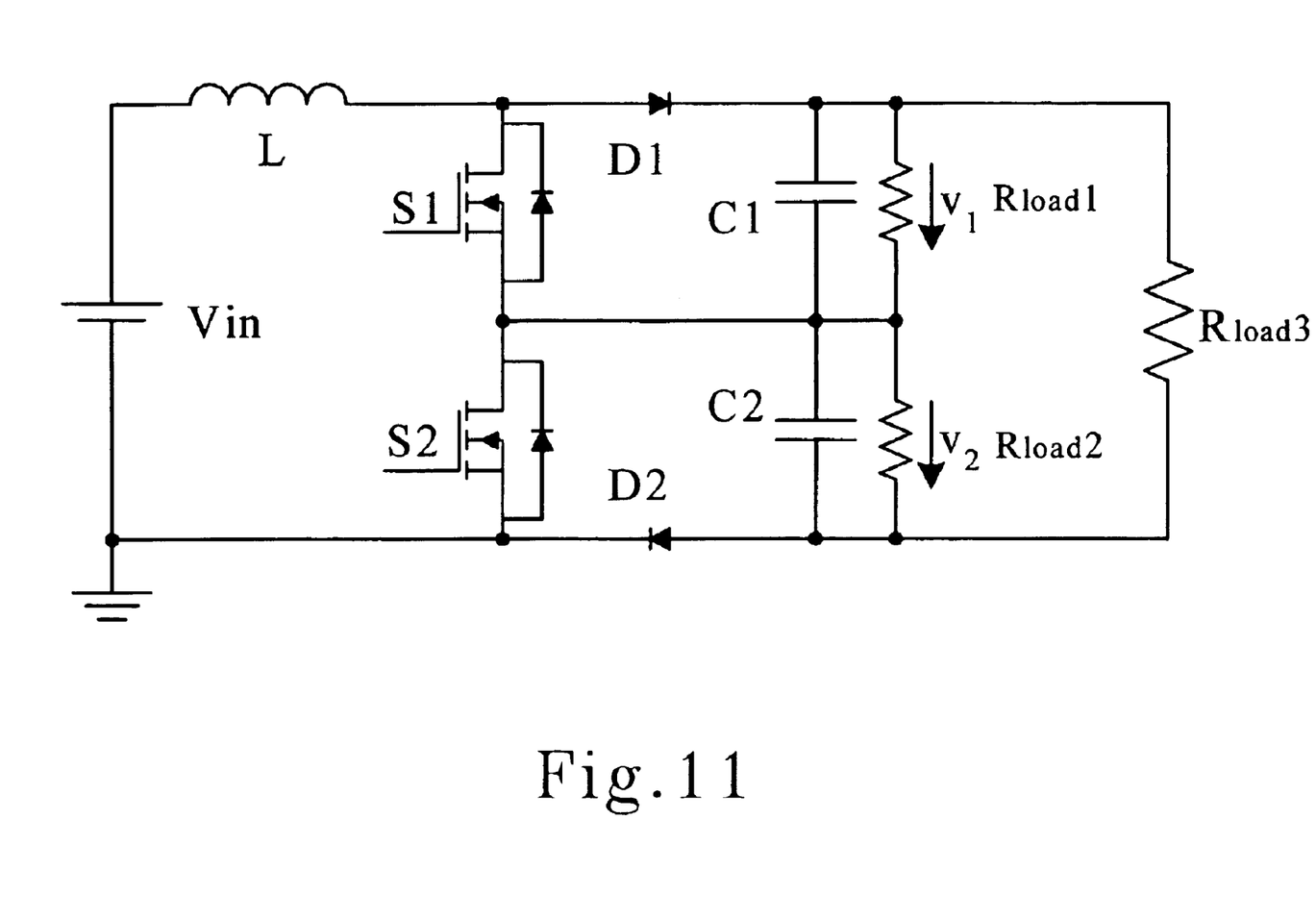
Figure 12:
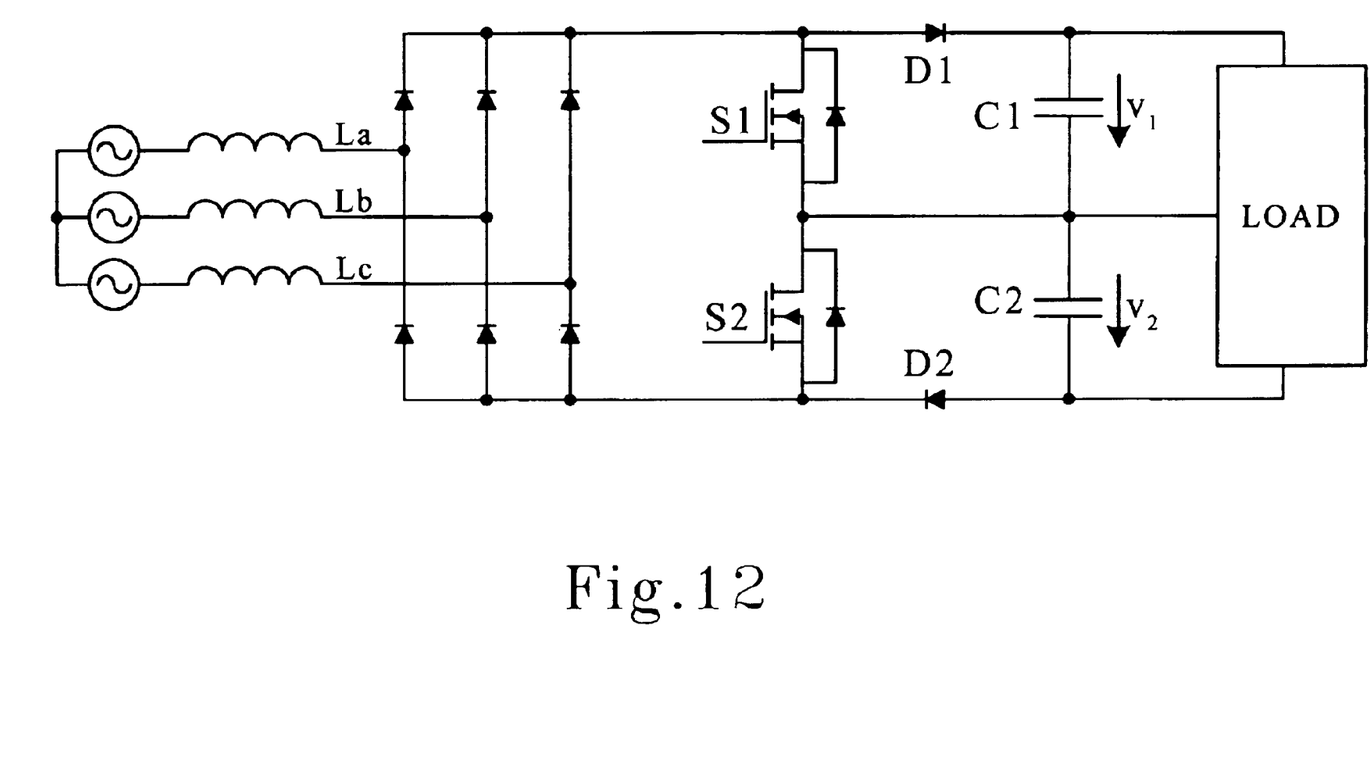
Figure 13:
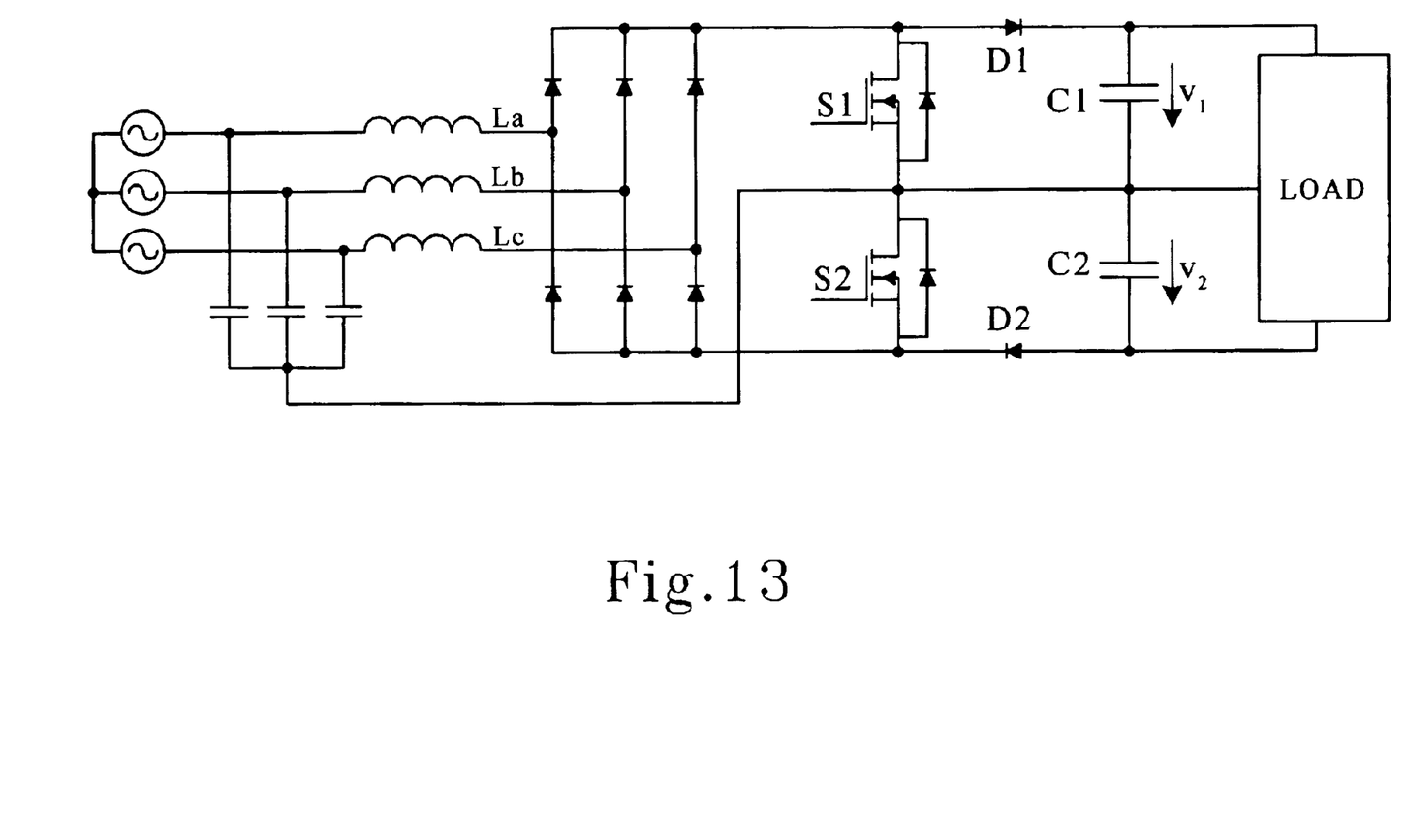

The cross regulation technique proposed in the present invention can be applied to the preferred embodiments as shown in FIGS. 7 to 13. The load in the above-mentioned preferred embodiments is not limited to the resistive elements, and the switch element is not limited to the MOSFET. Furthermore, the cross regulation and the methods of the present invention are also applicable to the preferred embodiments with two co-existed loads as shown in FIGS. 8 and 10 respectively.

In conclusion, the cross regulation and methods for controlling a three-level boost converter are proposed in the present invention with a relatively simple method to control and the problem regarding the power consumption of the balancing resistors in the prior art is also avoided such that a relatively better efficiency of the three-level converter could be achieved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for controlling a boost converter with a cross regulation controller, wherein said boost converter comprises a first switch element, a second switch element, a first output capacitor, and a second output capacitor, said first switch element is connected to said second switch element at a first node in series, said first output capacitor is connected to said second output capacitor at a second node in series, and said first node is electrically connected to said second node, and said controller comprises a first processor, a second processor, a first modulator, a second modulator, a first pulse generation unit, and a second pulse generation unit, said method comprising steps of:

(a) detecting a first voltage through sampling a voltage across said first output capacitor and a second voltage through sampling a voltage across said second output capacitor respectively;

(b) setting a reference voltage;

(c) obtaining a first output signal and a second output signal through processing said second voltage and said reference voltage by said first processor, and processing said first voltage and said reference voltage by said second processor respectively;

(d) generating a first voltage modulated signal and a second voltage modulated signal through processing said first output signal by said first modulator, and processing said second output signal by said second modulator respectively;

(e) generating a first driving signal and a second driving signal through processing said first voltage modulated signal by said first pulse generation unit, and processing said second voltage modulated signal by said second pulse generation unit respectively; and (f) controlling said first switch element to be in one of an open status and a close status and said second switch element to be in one of an open status and a close status through said first driving signal and said second driving signal respectively so as to achieve a balancing status between said first voltage and said second voltage.

2. The method according to claim 1, wherein said reference voltage is equivalent to one half of a sum of said first voltage and said second voltage.

3. A method for controlling a boost converter, wherein said boost converter comprises a first switch element, a second switch element, a first output capacitor, and a second output capacitor, said first switch element is connected to said second switch element at a first node in series, said first output capacitor is connected to said second output capacitor at a second node in series, and said first node is electrically connected to said second node, said method comprising steps of:

(a) detecting a first voltage through sampling a voltage across said first output capacitor and a second voltage through sampling a voltage across said second output capacitor respectively;

(b) setting a reference voltage;

(c) obtaining a third voltage and a fourth voltage through processing said second voltage with said reference voltage and said first voltage with said reference voltage respectively;

(d) generating a first pulse signal and a second pulse signal by processing said third voltage through a first pulse generation unit and by processing said fourth voltage through a second pulse generation unit respectively; and (e) controlling said first switch element to be in one of an open status and a close status, and said second switch element to be in one of an open status and a close status through said first pulse signal and said second pulse signal respectively so as to achieve a balancing status between said first voltage and said second voltage.

4. The method according to claim 3, wherein said reference voltage is equivalent to one half of a sum of said first voltage and said second voltage.

5. The method according to claim 3, wherein said third voltage equals to said reference voltage minus said second voltage and said fourth voltage equals to said reference voltage minus said first voltage respectively.

6. The method according to claim 3, wherein said step (d) further comprises steps of:

generating a first voltage modulated signal and a second voltage modulated signal by processing said third voltage through a first voltage modulator and processing said fourth voltage through a second voltage modulator respectively; and generating said first pulse signal and said second pulse signal by processing said first voltage modulated signal through said first pulse generation unit and processing said second voltage modulated signal through said second pulse generation unit respectively.

7. A cross regulation controller for controlling a boost converter, wherein said boost converter comprises a first switch element, a second switch element, a first output capacitor, a second output capacitor, a first voltage across said first output capacitor, and a second voltage across said second output capacitor, said first switch element is connected to said second switch element at a first node in series, said first output capacitor is connected to said second output capacitor at a second node in series, said first node is electrically connected to said second node, and said controller is employed to achieve a balancing status between said first voltage and said second voltage, comprising:

a first feedback control circuit, wherein a feedback of said second voltage and a reference voltage are processed to generate a third voltage, said third voltage is transformed to generate a first pulse signal, and said first pulse signal is used to drive said first switch element; and a second feedback control circuit, wherein a feedback of said first voltage and said reference voltage are processed to generate a fourth voltage, said fourth voltage is transformed to generate a second pulse signal, and said second pulse signal is used to drive said second switch element.

8. The controller according to claim 7, wherein said reference voltage is equivalent to one half of a sum of said first voltage and said second voltage.

9. The controller according to claim 7, wherein a first voltage modulated signal is generated by said first feedback control circuit with said third voltage and processed through a first pulse generation unit so as to generate a first PWM signal.

10. The controller according to claim 7, wherein a second voltage modulated signal is generated by said second feedback control circuit with said fourth voltage and processed through a second pulse generation unit so as to generate a second PWM signal.

11. The controller according to claim 7, wherein said third voltage equals to said reference voltage minus said second voltage and said fourth voltage equals to said reference voltage minus said first voltage respectively.

12. The controller according to claim 7, wherein said controller further comprises a processor to subtract said second voltage from said reference voltage to generate said third voltage and to subtract said first voltage from said reference voltage to generate said fourth voltage respectively.

* * * * *